United States Patent [19]

Johnstone

[11] Patent Number: 4,533,859
[45] Date of Patent: Aug. 6, 1985

[54] MOTORIZED BALL NUT

[75] Inventor: Richard Johnstone, Brookfield, Wis.

[73] Assignee: Kearney & Trecker Corporation, West Allis, Wis.

[21] Appl. No.: 358,346

[22] Filed: Mar. 15, 1982

[51] Int. Cl.³ .............................................. G05B 1/06
[52] U.S. Cl. ................................... 318/661; 318/630; 318/9
[58] Field of Search .................................... 318/9–11, 318/14, 661, 798, 799, 721, 630; 310/266

[56] References Cited

U.S. PATENT DOCUMENTS

| | | | |
|---|---|---|---|
| 3,056,909 | 10/1962 | Tripp | 318/661 X |
| 3,111,614 | 11/1963 | Phillips et al. | 318/661 X |
| 3,666,141 | 5/1972 | Ma et al. | 318/661 X |
| 3,798,430 | 3/1974 | Simon et al. | 318/661 X |
| 4,134,106 | 1/1979 | Hungerford | 318/661 X |
| 4,234,777 | 11/1980 | Balfanz | 318/661 X |

FOREIGN PATENT DOCUMENTS 14539 of 1957 Japan .

Primary Examiner—B. Dobeck
Attorney, Agent, or Firm—Quarles & Brady

[57] ABSTRACT

A motorized nut for use in conjunction with a fixedly secured lead screw for displacing a movable member along a fixed member into which the lead screw is journaled parallel to the desired path of member movement, includes an induction motor whose case is rigidly secured to the movable member. The motor rotor is made hollow so as to allow the lead screw to extend coaxially therethrough. A pair of nuts are each secured in a separate one of the ends of the tubular motor rotor for threadedly engaging the lead screw so that as the motor rotor rotates in response to motor excitation, the motor stator and hence, the movable member, are displaced on the movable member along the axis of the ball screw.

3 Claims, 2 Drawing Figures

MOTORIZED BALL NUT

BACKGROUND OF THE INVENTION

This invention relates generally to machine tools and more particularly, this invention relates to a motorized nut for use in combination with a lead screw for precisely displacing a movable machine tool member on a fixed machine tool member along a straight path.

In the design of various types of machinery, and particularly machine tools, an important design criterion is the ability to precisely displace a movable member, such as an axis slide in the case of a machine tool, on a fixed member, such as the machine tool bed, along a straight path. Invariably, where precise movable member positioning is required, the combination of a lead screw, and a nut, and in particular, a ball type lead screw, and ball nut have been employed, the ball nut typically being secured to the movable member while the ball screw is rotatably journaled in the fixed member in threaded cooperation with the ball nut for displacing the movable member along the fixed member responsive to ball screw rotation.

In present day machine tools which employ the combination of a ball screw and a ball nut for precisely displacing a machine tool axis slide on the machine tool bed, the ball screw is typically driven from either an electric or a hydraulic motor through a gear box. Driving the ball screw from the motor through a gear box yields superior machine tool performance in contrast to directly driving the screw from the motor via universal coupling as the direct drive arrangement suffers from greater backlash due to the resiliency of the universal coupling. Further, use of a gear box to couple the motor to the ball screw affords greater rigidity to the ball screw which is very desirable. The disadvantage of employing a gear box to couple the ball screw to the motor is that such gear boxes are costly to manufacture. Further, while employing a gear box to couple the motor to the ball screw reduces backlash as compared to coupling the motor directly to the ball screw via a universal coupling, still some backlash is inherent with the gear box which reduces positioning accuracy.

In comparison, the present invention concerns a positioning system employing a motorized nut in combination with a rigid lead screw and this, eliminates the above-enumerated disadvantages of the prior art lead screw nut positioning mechanisms.

It is an object of the present invention to provide a positioning system employing a motorized nut in combination with a rigid lead screw so as to achieve minimum backlash between the screw and the nut.

It is yet another object of the present invention to provide a positioning mechanism including a motorized nut and a rigidly fixed lead screw to assure rigid coupling between the movable member and the fixed member as the movable member is displaced thereacross.

BRIEF SUMMARY OF THE INVENTION

Briefly, in accordance with the preferred embodiment of the invention, a positioning apparatus for displacing a movable member relative to a fixed member comprises a rigid lead screw secured to the fixed member parallel to the desired path of movable member movement and a motorized nut in threaded engagement with the lead screw and secured to movable member for displacing the movable member along the lead screw. The motorized nut is typically configured of an induction motor having a case or frame secured to the movable member by bolts or the like. The induction motor rotor, which extends through the case, is made hollow so as to be coaxial about the lead screw. A pair of nuts are each disposed in separate ends of the induction motor rotor to threadedly engage the lead screw so that as the induction motor rotor rotates about the lead screw, the induction motor and the movable member are thus displaced on the fixed member along the axis of the lead screw. Precise displacement of the movable member on the fixed member is facilitated by a feedback transducer which determines the actual movable member position. In practice, the feedback transducer may take the form of a resolver affixed to the induction motor frame so that the resolver shaft is driven from the induction motor rotor. The resolver output signal, which varies in accordance with resolver shaft position and hence, induction motor shaft position, is supplied to an N/C control circuit which controls induction motor stator excitation in accordance with the difference between desired movable member position, as represented by N/C commands entered to the N/C control circuit and actual movable member position, as represented by the resolver output signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
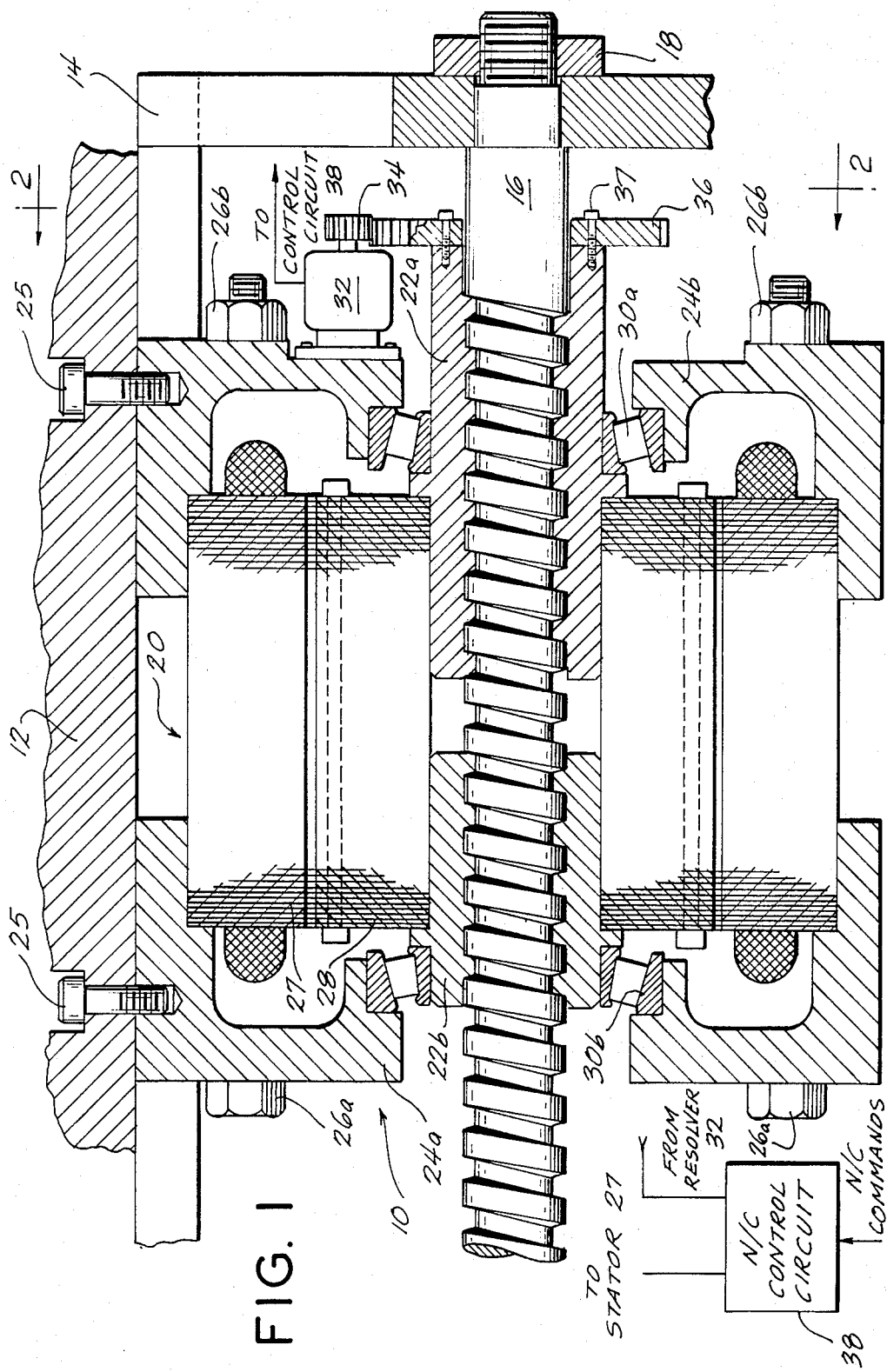
FIG. 1 is a longitudinal cross section of the positioning apparatus of the present invention.
Figure 2:
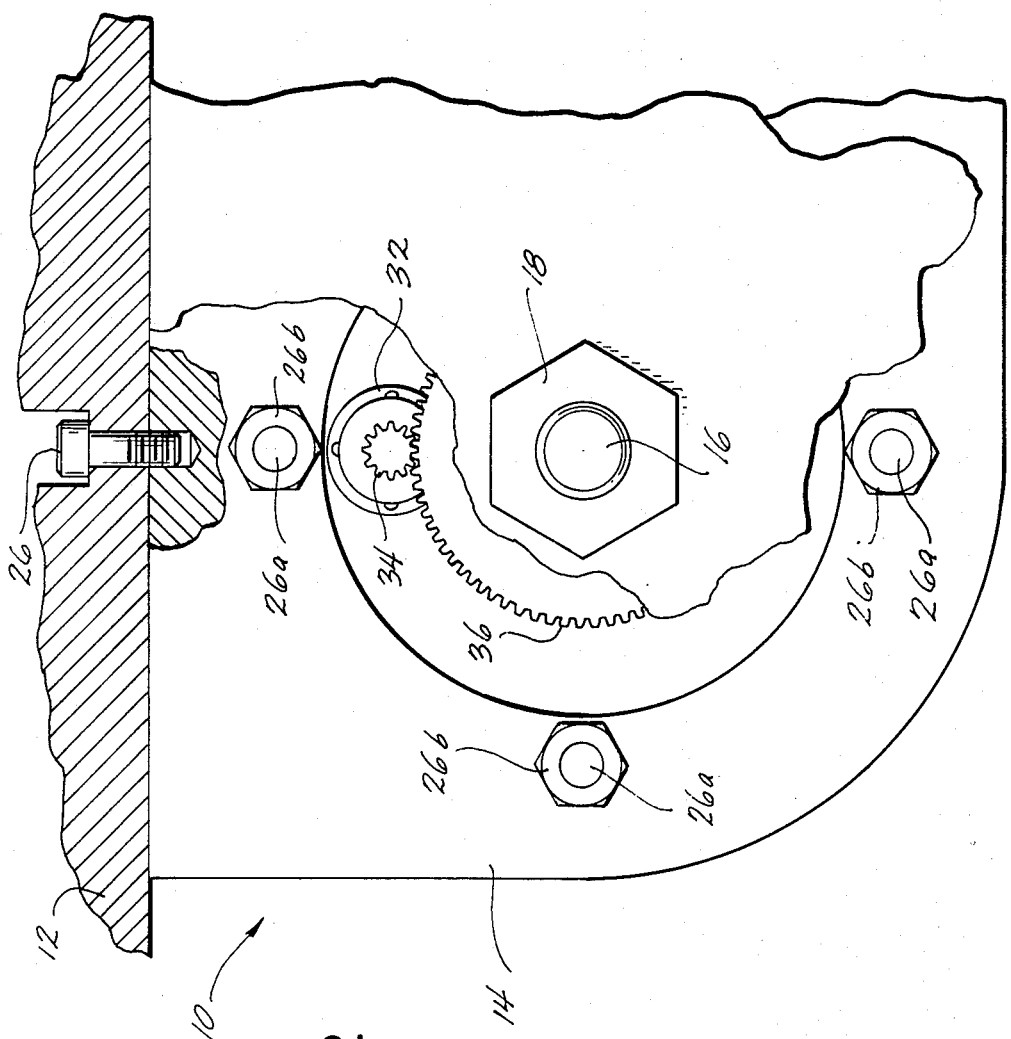
FIG. 2 is a cut away end view of the apparatus of FIG. 1.

FIGS. 1 and 2 show a longitudinal cross section and an end view, respectively, of an improved positioning apparatus 10 constructed in accordance with the teachings of the present invention for positioning a movable member 12 such as the axis slide of a machine tool on a fixed member 14, such as the bed of a machine tool, along a linear path. Positioning apparatus 10 includes a lead screw 16 which typically has Acme type threads and which is rigidly secured in machine tool bed 14 by a pair of fasteners 18 (only one of which is shown) so that the lead screw extends parallel to the desired path of movement of axis slide 12 on bed 14. Unlike conventional axis slide positioning mechanisms in which the lead screw is rotatably journaled into the machine tool bed, in the present invention, lead screw 16 is rigidly secured in bed 14 so as to be non-rotatable.

The heart of the present invention is a motorized nut which includes a prime mover 20 fastened to slide 12 for driving each of a pair of Acme threaded nuts 22a and 22b which are in spaced apart threaded engagement with the lead screw. In the presently preferred embodiment, prime mover 20 comprises and induction motor whose frame consists of a lefthand and righthand end caps 24a and 24b which are each secured to slide 12 by a separate one of bolts 25 so as to move in unison with slide 12 on bed 14. The end caps which each have a hollow bore therethrough for receiving lead screw 16, are secured to each other by a pair of long bolts 26a and nuts 26b. Induction motor 20 includes a multiphase wound stator 27 secured between end caps 24a and 24b and a hollow bore squirrel cage rotor 28 which is journaled to each of end caps 24a and 24b by a separate one of bearings 30a and 30b, respectively, so that rotor 28 is coaxial about lead screw 16. When induction motor stator 27 is excited with an alternating current, the motor stator generates a rotating magnetic field which causes an oppositely-poled magnetic field to be induced in rotor 28. The interaction between the rotating stator field and the induced rotor magnetic field causes the rotor to rotate within the stator. Each of nuts 22a and 22b is secured in an opposite one of the ends of rotor 28 so as to be threaded in unison along lead screw 16 as rotor 28 rotates within stator 27 responsive to electrical excitation of the stator.

Accurate positioning of slide 12 on bed 14, that is to say, positioning of the slide to an exact location on the bed, is accomplished by controlling the excitation of stator 27 in accordance with the difference between the desired and actual position of the slide. To this end, a feedback transducer 32, is provided which, in the present embodiment, comprises a resolver which is secured to the induction motor frame, typically to frame end cap 24b, so that a gear 34 on the shaft of resolver 32 meshingly engages a complementary gear 36 secured to the outwardly exposed face of nut 22a by bolts 37. Thus, as induction rotor 28 and nuts 22a and 22b rotate in response to the application of electrical excitation on stator 27, gear 34 is diven by gear 36 to rotate the resolver shaft, causing the resolver to output an electrical signal which varies in accordance with the resolver shaft orientation and hence, the angular orientation of rotor 28.

The electrical output signal from resolver 32, which varies in accordance with the induction motor angular orientation and hence, the actual position of slide 12 on bed 14, is supplied to a numerical control circuit 38 such as are well known in the art. Numerical control circuit 38 is responsive to numerical control commands generated by a tape reader or the like which are indicative of the desired position of slide 12 and, when supplied with such numerical control commands, the N/C control circuit generates an output signal for controlling stator 27 excitation in accordance with the difference between the desired and actual slide position, as determined from the difference between the slide position specified by numerical control commands received by the N/C control circuit and the actual slide position as represented by the output signal of resolver 32.

The foregoing describes an improved positioning apparatus comprised of a rigidly fixed lead screw and a motorized nut in threaded engagement with the lead screw, the motorized nut being affixed to a movable member for displacing the movable member along the fixed member parallel to the axis of the screw. Since the distance between nuts of the present invention, which are coaxial with, and directly driven by the motor rotor can be varied at the outset of operation, the motorized nut of the present invention has practically no backlash. Further, the rigid mounting of the lead screw to the fixed member assures a rigid coupling between it and the movable member.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims. For example, prime mover 20 could easily be configured of a hydraulic motor in place of the illustrated induction motor. Further, a linear position transducer, such as a digital encoder or an optical position transducer, could easily be substituted for the rotary feedback transducer shown as resolver 32. Also, while a conventional Acme threaded lead screw and nut have been disclosed, other types of lead screw-nut combinations, such as the well known ball nut, ball screw combination could easily be substituted therefor.

What is claimed and desired secure by United States Letters Patent is:

1. In a machine tool having a movable member mounted on a support for movement in a predetermined path of travel relative to said support; a control circuit connected to regulate the operation of the machine tool; and a drive mechanism connected to drive said movable member in its path of travel and comprising: a screw rigidly mounted on said support and fixed against rotation; a nut in threaded engagement with said screw; a motor frame rigidly secured to said movable member; an annular stator mounted to said frame; means electrically connecting said stator to the numerical control circuit to be energized thereby; a rotor disposed within the central opening of said stator to be rotated thereby and having an axial bore for receiving said nut; means securing said nut to said rotor for rotation in unison therewith; a transducer supported by said frame and connected to rotate with said nut, and means connecting said transducer to the numerical control circuit to provide feedback information for use by the numerical control circuit in controlling the rotation of the rotor.

2. A machine tool according to claim 1 including a pair of bearings mounted between said frame and said nut for supporting said nut for rotation relative to said frame.

3. A machine tool according to claim 1 wherein said nut is a split nut with the two portions of the nut being adjustable relative to each other for removing backlash between the nut and the screw.

* * * * *